Figure 1:
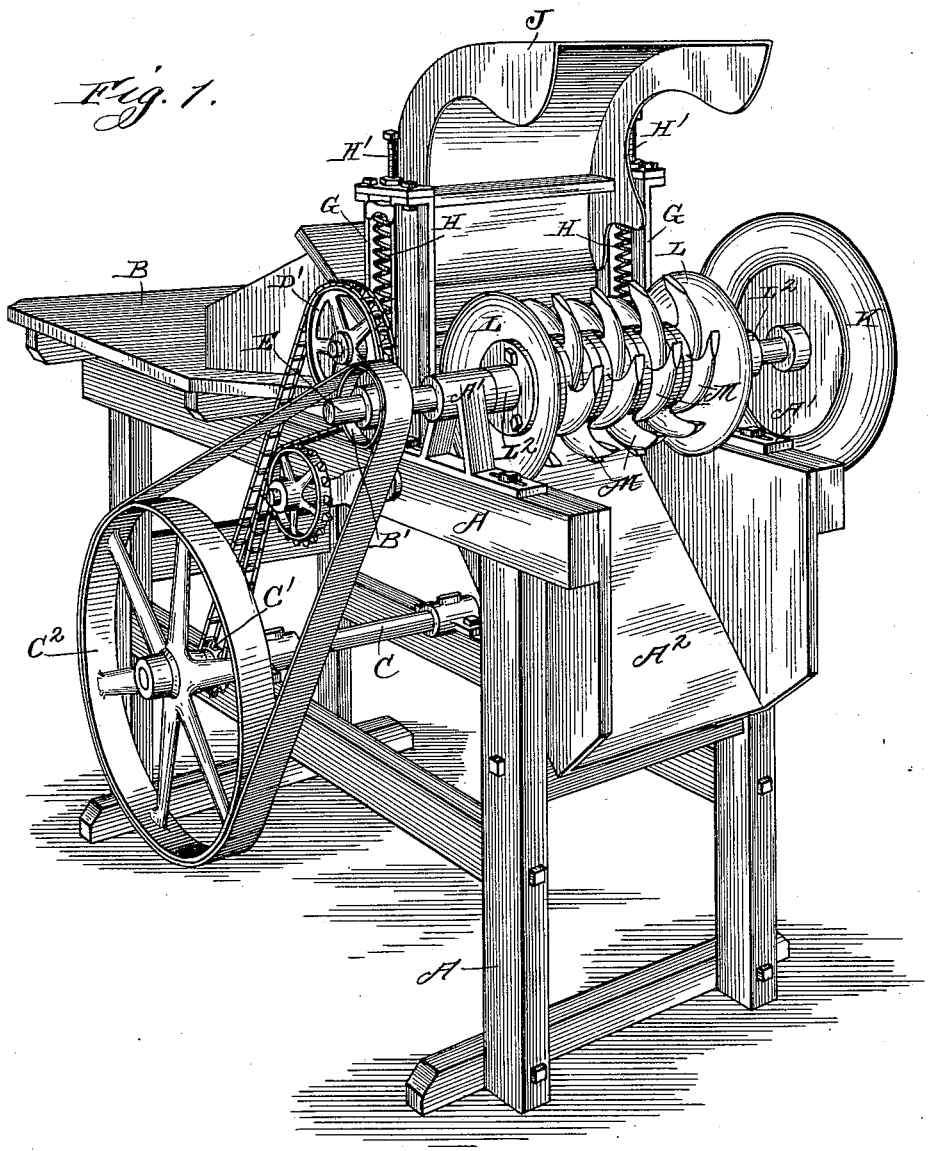

No. 648,151.  
J. C. LESLIE.  
HEAD FOR FODDER SHREDDERS, &c.  
(Application filed Sept. 2, 1898.)  
Patented Apr. 24, 1900.

(No Model.)  
2 Sheets—Sheet 1.

No. 648,151. Patented Apr. 24, 1900.
J. C. LESLIE.
HEAD FOR FODDER SHREDDERS, &c.
(Application filed Sept. 2, 1898.)

(No Model.) 2 Sheets—Sheet 2.

Witnesses:
R. J. Jacker.
Allan A. Murray

Inventor:
Joseph C. Leslie,
By Coburn, Stibben & McElroy
Attys.

UNITED STATES PATENT OFFICE.

JOSEPH C. LESLIE, OF ST. ALBANS, VERMONT.

HEAD FOR FODDER-SHREDDERS, &c.

SPECIFICATION forming part of Letters Patent No. 648,151, dated April 24, 1900.

Application filed September 2, 1898. Serial No. 690,096. (No model.)

*To all whom it may concern:*

Be it known that I, JOSEPH C. LESLIE, a resident of St. Albans, in the county of Franklin and State of Vermont, have invented certain new and useful Improvements in Heads for Fodder-Shredders, &c., of which the following is a specification.

My invention relates to a new and improved construction for the heads of fodder-shredders and similar machinery, which are designed to shred or tear up cornstalks or similar material into a fine condition in which they somewhat resemble coarse hay and in which state they can be fed the same as hay.

As the machines have hitherto been constructed in practice the carrying portions of the heads consisted of a series of circular saws with large teeth, set parallel to each other and at an oblique angle to the shaft, as shown in my Patent No. 551,774, dated December 24, 1895. Sometimes instead of setting the saws at an oblique angle to the shaft in order to cover the space between them by the teeth the saws have been set at right angles to the shaft and have had their teeth bent over from each side irregularly, so as to cover the space between the saws in that way. These constructions were very expensive and open to the objection that the most of the teeth were set with their points at an oblique angle to the point of their support on the shaft, so that the saws were always under a great strain resulting from the centrifugal force and, furthermore, worked at such a disadvantage as made such heads great power consumers. My invention is designed to remedy all these defects and simplify the construction very materially by constructing my head of a series of preferably annular disks strung upon a shaft at regular angular intervals with each other, each one having one or, possibly, two teeth projecting therefrom at right angles to the shaft, so that the teeth of a sufficient number of the disks to make the total sum of their angular separations three hundred and sixty degrees represent a single spire of teeth, there being as many spires in the entire spiral on the shaft as would be determined by the number of disks employed, that number being an exact multiple of the number of teeth necessary to form a single spire in order that the shaft may be balanced.

Another objection to these heads as hitherto arranged has been the fact that the points of the corresponding teeth on all the saws form lines parallel to the axis of the shredder-head, so that several of the teeth arrive at the point of work simultaneously, and consequently cause the head to cut with greater difficulty, as there are several teeth at work at one instant, while no teeth are at work until the next row presents itself to the point of work. In my improved construction I arrange the points of the corresponding teeth so that they shall form spirals of a slight pitch to the axis of the head, so that more than one tooth is never at the point of work at one instant.

Another feature of my invention consists of the construction of the tooth having the ordinary chisel edge, but arranged so that the throat of the tooth shall also have a cutting edge to facilitate the work of shredding.

Another feature of my invention consists in providing each head with a pair of disks at its ends, preferably convex toward the center of the head, so as to crowd all the material coming between them directly into the path of the teeth constituting the head proper.

In order to secure a better understanding of my invention, reference is had to the accompanying two sheets of drawings, in which the same letters of reference are used to designate identical parts in all the figures, of which—

Figure 2:
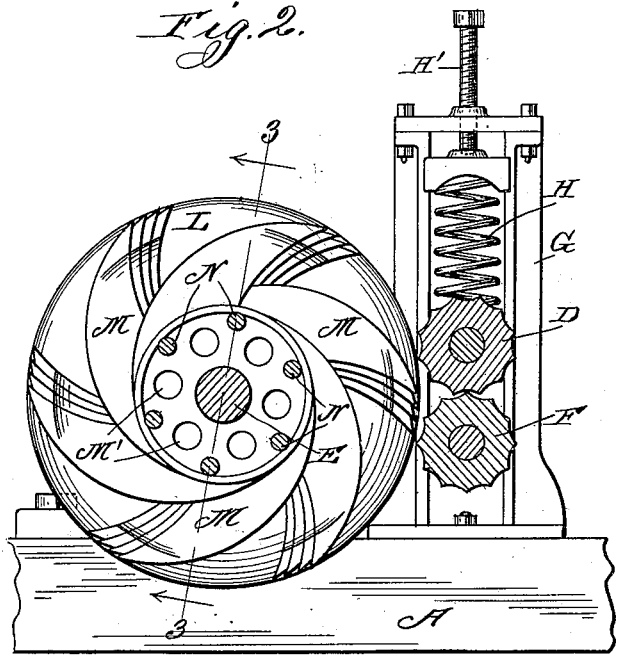
Figure 4:
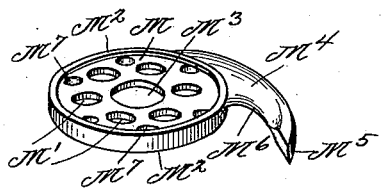
Figure 3:
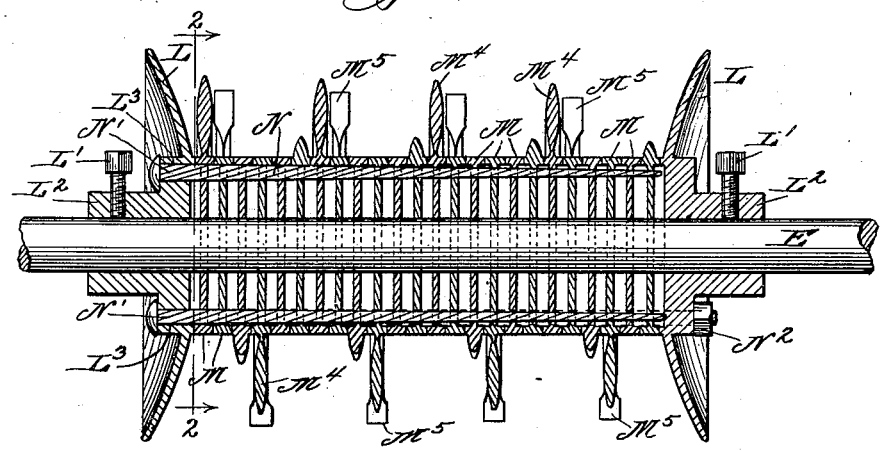

Figure 1 is a perspective view of the complete machine with the hood raised to expose the shredder-head. Fig. 2 is a section through the shredder-head and feed-rolls on the line 2 2 of Fig. 3. Fig. 3 is a longitudinal section through the shredder-head on the line 3 3 of Fig. 2, and Fig. 4 is a perspective view of one of the disks and its tooth.

Referring more especially to Fig. 1, A represents the framework of the machine, upon the upper surface of which is the feed-table B, upon which the fodder is placed and by which it is directed to the feed-rolls D and F. (See Fig. 2.) Suitably mounted in the lower part of the framework is the shaft C, through which the power may be applied and which has on one end thereof the sprocket-gear C', which by means of a sprocket-chain drives the sprocket-wheel D', fastened upon one end of the shaft carrying the upper feed-roll D. As ordinarily operated, the feed-rollers are run at the rate of about one hundred and ten revolutions to the minute, and in order to run the shredder-head at the much higher rate of speed desired, about fifteen hundred revolutions per minute, I have fastened upon the shaft C the large belt-wheel $C^2$, which drives by means of the customary belt the small belt-pulley B', fastened upon the shaft E of the shredder-head. The feed-rolls D and F, which are preferably of the "snapping-roll" type, about three inches in diameter and deeply fluted, are geared to rotate synchronously, and have their ends mounted in the standards G, which contain the strong expanding helical springs H, which press the feed-rolls together, and which is further provided with a screw, as at H', whereby the tension of the springs upon the rolls may be increased.

J is the customary hood, which when closed down covers the shredder-head, which by its well-known action upon the material fed through the rolls D and F tears the fodder into shreds, which are discharged through the chute $A^2$.

The features hitherto described are not claimed in the present application, they being, so far as they are inventions of mine, covered by my prior patents.

The shredder-head proper is carried by the shaft E, which is mounted in the bearings A', which are arranged so that the teeth of the shredder-head may be adjusted as closely as may be desired to the feed-rolls, the lower one of which, F, acts as a cutter-bar for the head. The customary fly-wheel K is mounted on the end of the shaft E opposite to that upon which the pulley-wheel E' is mounted. Two disks L, having, preferably, convex inner surfaces, are fastened to the shaft E just inside of the bearings A' by means of the set-screws L', mounted in the collar $L^2$, forming the center of the disks. The object of these disks, as previously explained, is to crowd the material which has a tendency to work out at the ends toward the center of the head and directly into the path of the teeth. The shredding-disk M (best shown in Fig. 4) consists of a disk which for economy of weight and material is preferably thin in its center and has the holes M' cast therein to further reduce the weight. The flange $M^2$, constituting the periphery of the disk, is much thicker than the central web, and these flanges of adjacent disks contact closely, as shown in Fig. 3. The large hole $M^3$, bored in the center of the disk, permits its being strung upon the shaft E. The shredding is accomplished by the tooth $M^4$, projecting from the periphery of the disk and of the peculiar shape which has been found to be the best in this class of machines. The point of the tooth has a chisel-edged cutting end $M^5$, preferably slightly longer than the depth of the flange $M^2$ and which is tempered carefully and can be ground to any degree of sharpness that may be required. Instead of having the throat $M^6$ of the tooth flat like one of the sides of the end $M^5$, as has been hitherto customary in shredder-teeth, I cast or otherwise shape it so that it is a cutting edge which assists materially in the shredding action and is especially useful in overcoming any tendency of the material to clog up and choke the shredder-head. To secure these disks in place on the shaft, I bore therein the equidistant holes $M^7$ near the periphery, and through these holes I pass one or more rods N, which have square or polygonal heads N', fitting into the apertures $L^3$, which have similar cross-sections to prevent the rods turning in one of the disks L, and the other ends of which are screw-threaded to receive the nuts $N^2$, which are secured on the outer side of the other disk L. Thus it will be seen that as all of these disks M are exactly alike it is a very simple matter to build up the heads as they are strung upon the shaft E and the rods N, each one being placed so that it is in advance of the preceeding one an angular distance represented by the distance between the holes $M^7$. When it is desired to remove any tooth for sharpening or in case any breakage should occur, all that is necessary is to loosen one of the heads L and the nuts $N^2$, when the teeth above it can be lifted off and got at.

Of course it will be understood that I might, if it is deemed desirable, place more than one tooth upon each disk; but I have shown herein the preferred form, in which a single tooth is employed. In the construction shown six holes $M^7$ are employed, so that it takes six disks to complete a spire, and as twenty-four teeth are shown there are four complete spires in the machine. Of course the number of teeth to make a spire and the number of spires employed may be varied as the purposes of the machine demand.

In order to get the desired construction, in which not more than one of the teeth is ever at the working point at the same time, having assembled the disks L and M on the shaft E, I first fasten one of the disks L in place and then twist the other one backward or forward a certain distance—say for a twelve-inch head a distance of one inch—the rods M yielding sufficiently to permit this twisting, and I then fasten the hitherto free disk L securely in place by means of the set-screw L'. It will readily be observed that this construction might be employed in connection with the disks M, having any desired number of teeth, even if they were arranged so as to become an ordinary circular saw.

It will thus be seen that I have devised a shredder-head which is cheaply constructed, readily assembled, and possesses the several advantages hereinbefore set forth, and that I do not desire to be limited to the exact construction shown and described, but only desire to cover such modifications as are within the scope of my invention.

What I claim, and desire to secure by Letters Patent of the United States, is—

1. A head composed of a series of annular disks, each having one or more teeth projecting from the periphery thereof and having a concentric series of equidistant apertures therein, a collar secured to each end of the head adjacent to the bearings, and one or more rods fastened at their ends to said collars and passing through one of the apertures in each disk, the adjacent disks being arranged at an angular distance equal to that between two adjacent apertures in any disk, so that the points of the teeth form a helical spiral around the head.

2. In a shredder, the head composed of a shaft, with a series of annular disks M strung thereon, each having a cutting-tooth $M^4$ projecting from the periphery thereof and formed with a chisel-edged end and a narrower body portion having a cutting edge, and means for securing said disks on the shaft so that the ends of their teeth shall form a helical spiral about said shaft, the teeth being shaped as described above and spaced apart so that there is a space between adjacent teeth through which the material can pass to facilitate and secure the shredding action.

3. In a shredder, the head composed of a shaft, with the disks M strung thereon, having a thin central web with the holes $M^7$ therein, the wider annular flange $M^3$ and the tooth $M^4$ projecting from the said flange and having a chisel-edged end of substantially the same width as the flange but narrowed between this edge and the flange to form a throat; the rods N passing through the holes $M^7$ to hold the disks in such relative position that their teeth will form a helical spiral; and means for securing the rods N relative to the shaft.

4. A head composed of a shaft, with a series of toothed cutting disks strung thereon, each having a plurality of apertures therein, each equidistant from the adjacent apertures and from the center of the disk, a collar secured to one end of the shaft, one or more rods fastened at their ends to said collar, each passing through one of the holes in each disk, and a second collar on the shaft to which the other ends of the rods are fastened, and which is secured to the shaft at an angular variation from the first collar so that each of said rods will form a portion of a helical spire about said shaft.

5. A shredder-head comprising a disk formed with a peripheral flange and a forwardly-directed tooth having a chisel-edged end and a narrower shank joining it to said disk, said narrower shank being brought to a cutting edge in front, and adapted, in connection with adjacent teeth, to form a clearance for the cut material.

6. In a shredder-head, a plate or disk mounted upon a shaft and carrying the tooth $M^4$ formed with the chisel-edged end $M^5$ transverse to the line of advance and the narrowed portion between this end and the flange or hub carrying the tooth formed with a cutting edge at right angles to the axis of the shaft and in the line of movement and behind the point, substantially as described.

JOSEPH C. LESLIE.

Witnesses:
SADIE E. ANDREWS,
WM. SIMPSON.